(12) United States Patent
Wijaya

(10) Patent No.: US 6,401,881 B1
(45) Date of Patent: Jun. 11, 2002

(54) DOUBLE ACTION BRAKE SHOE

(76) Inventor: Heru Prasanta Wijaya, Graha Famili D. 183, P. Kali Kendal, Surabaya 60226 (ID)

( * ) Notice: Subject to any disclaimer, the term of this patent is extended or adjusted under 35 U.S.C. 154(b) by 0 days.

(21) Appl. No.: 09/555,250

(22) PCT Filed: Sep. 28, 1998

(86) PCT No.: PCT/IB98/01507

§ 371 (c)(1),
(2), (4) Date: Aug. 18, 2000

(87) PCT Pub. No.: WO00/19122

PCT Pub. Date: Apr. 6, 2000

(51) Int. Cl.[7] ............................................. F16D 69/00

(52) U.S. Cl. .............................. 188/250 R; 188/251 R; 188/250 B; 188/382

(58) Field of Search .................... 188/250 R, 251 R, 188/256, 259, 382, 250 B, 250 E

(56) References Cited

U.S. PATENT DOCUMENTS

| | | | |
|---|---|---|---|
| 3,684,062 A | | 8/1972 | Johnson .................. 188/251 R |
| 4,240,530 A | | 12/1980 | Tillenburg .............. 188/250 E |
| 5,535,860 A | * | 7/1996 | Hummel et al. ........ 188/250 B |

FOREIGN PATENT DOCUMENTS

| | | |
|---|---|---|
| GB | 1 310 843 | 3/1973 |
| GB | 1 359 570 | 7/1974 |

* cited by examiner

*Primary Examiner*—Paul N. Dickson
*Assistant Examiner*—Benjamin A. Pezzlo
(74) *Attorney, Agent, or Firm*—Christie, Parker & Hale, LLP

(57) ABSTRACT

A double action brake shoe comprising a shoe, a lining and an oscillator material as main components which function respectively as a reinforcing body of the brake shoe, a brake material and as a generator of certain vibration frequency when the shoe is applied to a hub. The lining is attached on the surface of the brake shoe and oscillator material is inserted between the shoe and the lining.

4 Claims, 4 Drawing Sheets

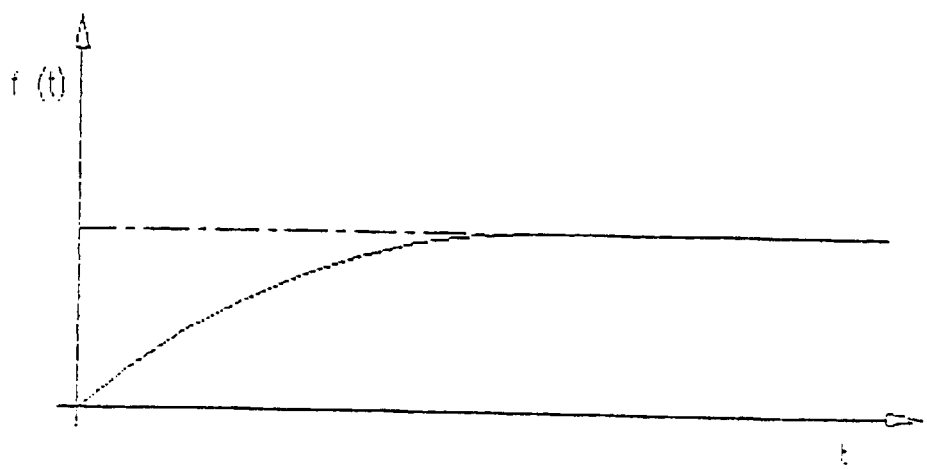
Fig • 4a
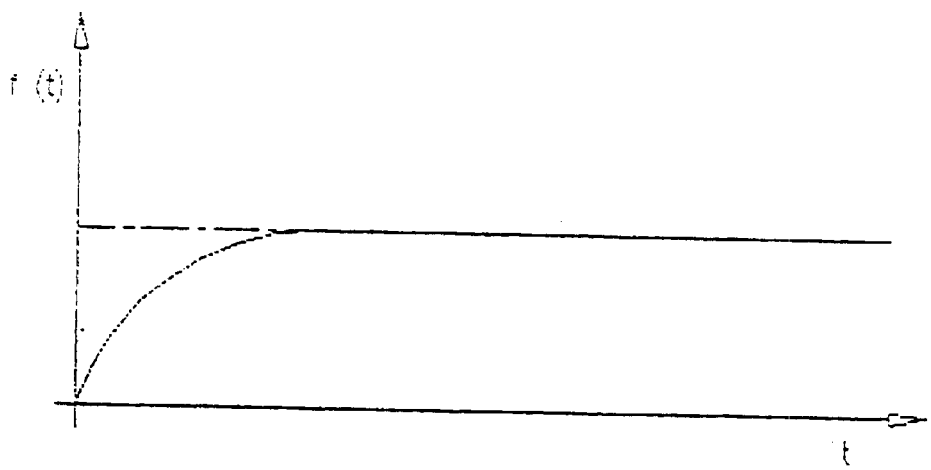
Fig • 4b
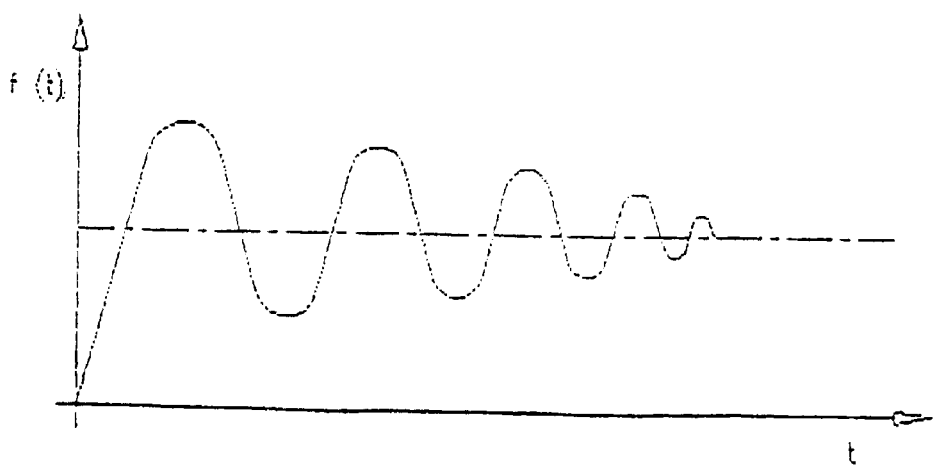
Fig • 4c

DOUBLE ACTION BRAKE SHOE

BACKGROUND OF THE INVENTION

Today's higher powered vehicles can go faster and require better brakes. To ensure the safety of driver and passengers, vehicles require the best possible braking systems. In the recent years, ABS (Anti-lock Braking System) brakes have been developed, which function by applying brake pressure periodically when the brake pedal is pushed down. In the latest ABS systems, a unit of anti-lock control system is added to control the brake system, however, the other conventional components like brake shoes and brake master are still being used.

These prior art ABS systems are too complicated and require too much space. These ABS systems are not practical when used in vehicles that have a limited space, like motorcycles.

For this reason, there is a need for a new system which is more simple than prior ABS systems, and which manipulate the vibration of the lining of the brake shoe, called double action brake shoe (DAB).

BRIEF DESCRIPTION OF INVENTION

The double action brake shoe includes three major components, and is shown in FIG. 1, namely a shoe that functions as a reinforcing body of the brake shoe, a lining at the surface of brake shoe that functions as a brake material with a certain friction coefficient, and oscillator material that is put between the shoe and the lining.

The oscillator material is made from a polymer elastomer which can hold to a certain temperature, and, for example, can be rubbers that can oscillate with a certain frequency when they get excitation braking force (assumption as a step function).

DESCRIPTION OF FIGURES

FIG. 4a is a graph showing the step force if the vibration coefficient is greater than one.

FIG. 4b is a graph showing the step force if the vibration coefficient is equal to one.

FIG. 4c is a graph showing the step force if the vibration coefficient is less than one.

DETAILED DESCRIPTION OF THE INVENTION

Figure 1A:
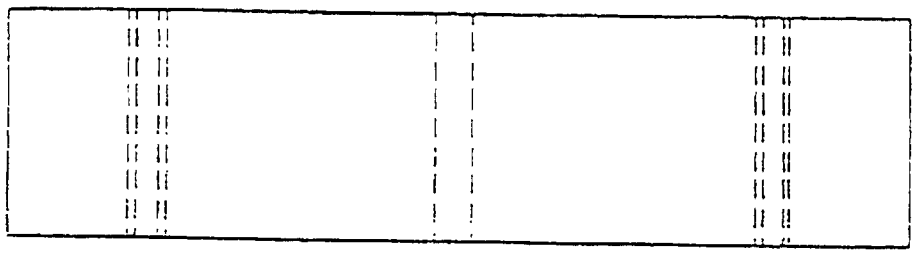
FIG. 1a is a top plan view of the double action brake shoe of the invention.
Figure 1B:
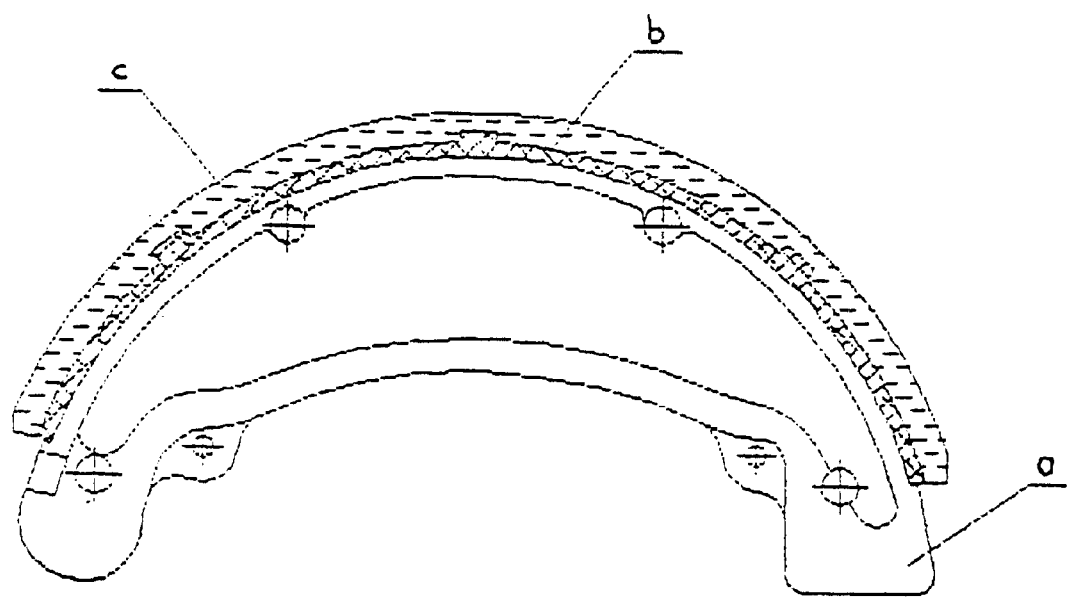
FIG. 1b is a side view of the double action brake shoe of the invention.
Figure 1C:
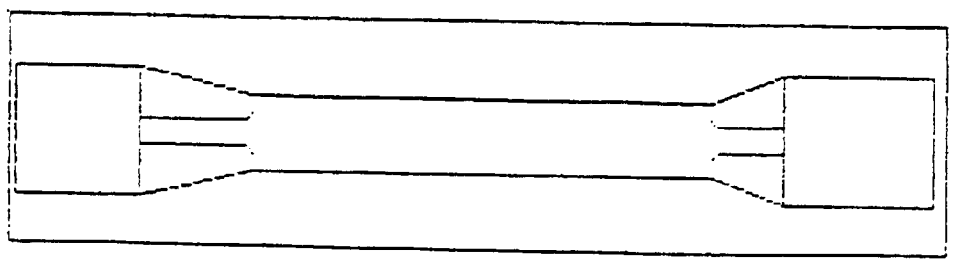
FIG. 1c is a bottom plan view of the double action brake shoe of the invention.

The double action brake shoe of the invention is a new design for brake shoes using the principle of harmonized vibrations. The construction of double action brake shoe consists of three major parts as shown in FIG. 1. The shoe a functions as a reinforcing body of the brake shoe. Oscillator material b that is made from a polymer elastomer, like rubbers which have a certain spring coefficient with a certain hardness, is affixed to the shoe a. The function of the oscillator material b acts as an anti-lock system if an excitation braking force is applied. The last part of the double action brake shoe is the lining c that has a function to act as a friction material with the hub of vehicle (not shown).

Figure 2:
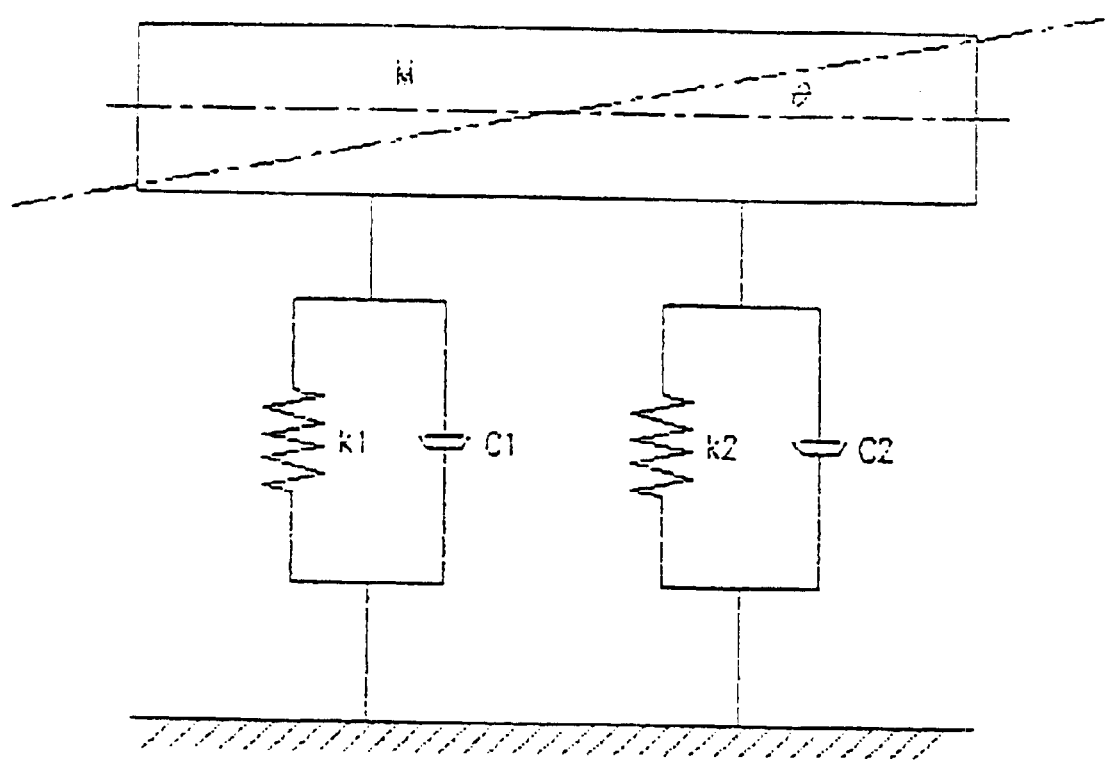
FIG. 2 shows the double action brake shoe of the invention modeled with a spring $k_1$ and $k_2$ damper $c_1$ and $c_2$ in parallel circuit.
Figure 3A:
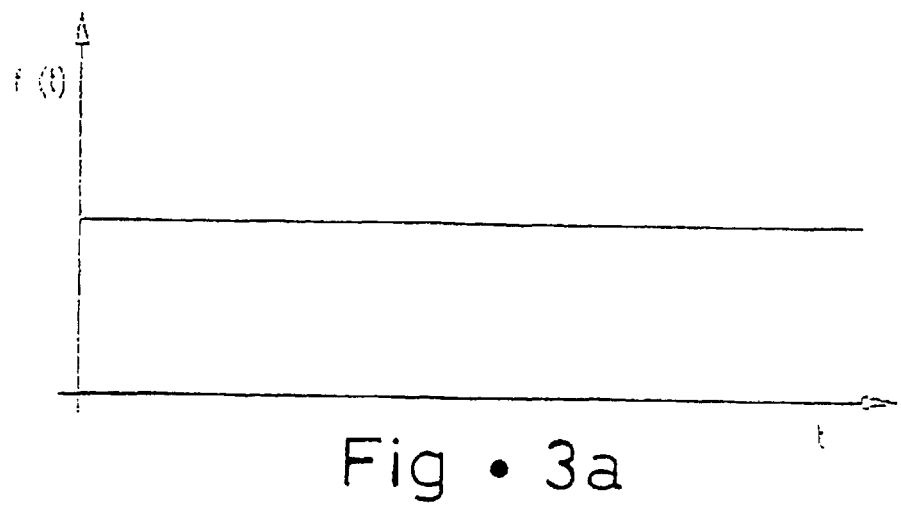
FIG. 3a is a graph showing the general brake force in a step.
Figure 3B:
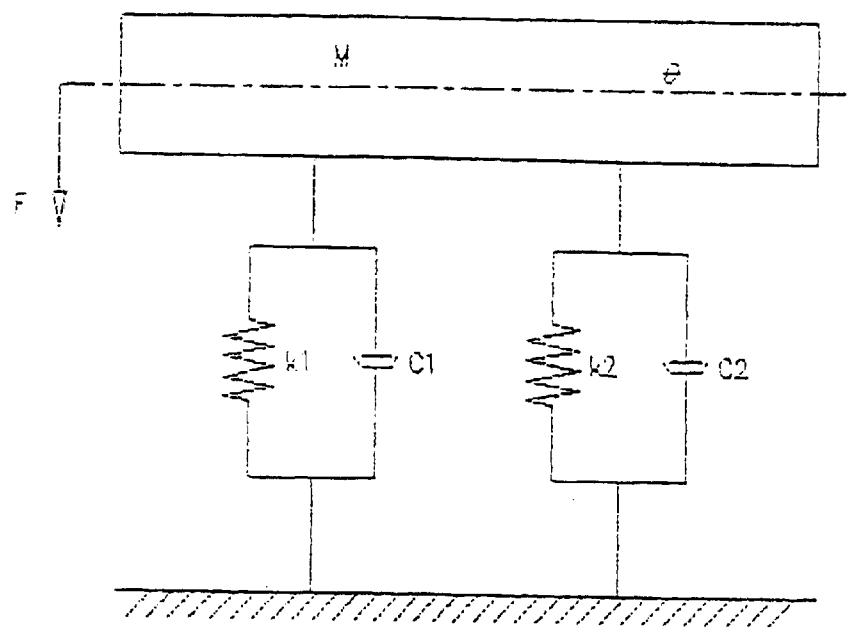
FIG. 3b shows the brake force applied to the double action brake shoe of FIG. 2.

FIG. 2 shows the basic principle of the double action brake shoe and can be modeled as having in parallel circuit springs $k_1$ and $k_2$ and dampers $C_1$ and $C_2$ with two degrees of freedom. With the assumption that the $k_1$ and $k_2$ excitation braking force is a step function, as shown in FIG. 3a, consequently, a model at FIG. 2 can be described by the general displacement equation:

$$[M]\{\ddot{y}(t)\}+[C]\{\dot{y}(t)\}+[K]\{y(t)\}=\{F(t)\} \qquad (I)$$

where,

[M] is a matrix of mass or inertia
$\{\ddot{y}(t)\}$ is a matrix of acceleration
[C] is a matrix of damping
$\{\dot{y}(t)\}$ is a matrix of velocity
[K] is a matrix of elastic spring coefficient
$\{y(t)\}$ is a matrix of displacement
$\{F(t)\}$ is a matrix of excitation force or braking force To get the response value in general coordinates, the linear transformation is applied to equation (I), so the result is:

$$\{\ddot{q}(t)\}+2\phi\omega\{\dot{q}(t)\}+\omega^2\{q(t)\}=\{G(t)\} \qquad (II)$$

where, $\{\ddot{q}(t)\}$ is a matrix of acceleration in general coordinates
$\{\dot{q}(t)\}$ is a matrix of velocity in general coordinates
$\{q(t)\}$ is a matrix of displacement in general coordinates
$\phi$ is a coefficient of vibration
$\omega$ is a frequency of vibration
$\{G(t)\}$ is a non dimensional excitation braking force With the excitation braking force $\{G(t)\}$ as a step function, responses as shown in FIGS. 4a, 4b, and 4c are achieved. If the coefficient of vibration $\phi>1$, an over damping vibration response, as shown in FIG. 4a is achieved. If the coefficient of vibration $\phi=1$, the critical vibration response as shown in FIG. 4b is achieved. If the coefficient of vibration $\phi<1$, the under damping vibration response shown in FIG. 4c is achieved so that oscillation occurs.

The spring coefficient and damping coefficient of the oscillator material can be adjusted by selection of polymer material and/or other additive materials that can be used to make oscillator material.

Figure 3C:
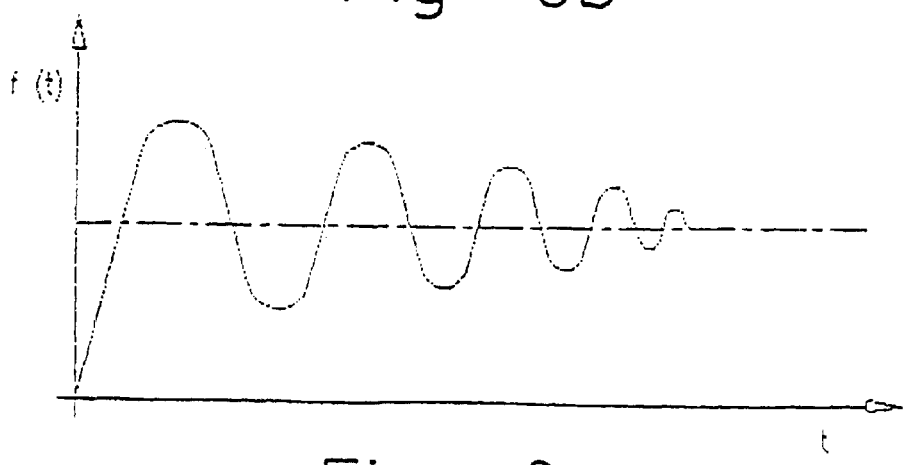
FIG. 3c is a graph showing the sinusoidal response with the double action brake shoe of FIG. 2.

Referring to FIG. 4, by setting the value of the spring coefficient and the damping coefficient of oscillator material, the under damped vibration response of FIG. 3c is achieved. Oscillator material that oscillate automatically will cause a friction force between the lining and the wheel hub that oscillates too, so the anti-lock effect will be achieved.

What is claimed is:

1. A double action brake shoe, comprising:

a brake shoe, an oscillator material applied to brake shoe, which oscillator material is made from a polymer elastomer, and a brake lining, the oscillator material being sandwiched between the brake shoe and the lining and the polymer elastomer being adapted to oscillate at a certain frequency when an excitation brake force is applied, thereby acting as a self-contained anti-lock brake.

2. The double action brake shoe of claim 1, wherein the oscillator material is rubber.

3. The double action brake shoe of claim 1, wherein the oscillator material can be selected such that the coefficient of vibration is less than 1, so that an under damping vibration response is achieved.

4. The double action brake shoe of claim 1, wherein a spring coefficient and a damping coefficient of the oscillation material can be adjusted by selection of the polymer elastomer and additive materials.

* * * * *